Patented Apr. 17, 1934

1,955,221

UNITED STATES PATENT OFFICE 1,955,221

COPPER-AMMONIA-FIBROIN SOLUTIONS

Karl Börner and Ernst Rossner, Premnitz, and Herbert Mahn and Wilhelm Irion, Dessau in Anhalt, Germany, assignors to I. G. Farbenindustrie Aktiengesellschaft, Frankfort-on-the-Main, Germany No Drawing. Application July 7, 1931, Serial No. 549,310. In Germany August 12, 1930

12 Claims. (Cl. 106—40)

This invention relates to the manufacture of ammoniacal copper oxide solutions of fibroin, and especially to the production of stable solutions of fibroin in ammoniacal copper oxide.

Processes are already known for dissolving fibroin in ammoniacal copper hydroxide and for working up the solutions into artificial products; however, neither the properties of the solutions nor those of the products made therefrom have been satisfactory. This defect is to be attributed to degradation of the fibroin molecule, which leads to a decrease in the viscosity of the solutions.

By the present invention the degradation of the fibroin molecule and the decrease in the viscosity of the solutions during storing are counteracted to such a degree that artificial products can be obtained which are by far superior to those hitherto obtainable from solutions of fibroin. For example, artificial silk fibers may be obtained having properties which resemble very closely those of fibroin fibers obtained from the cocoon.

The means applied according to our invention in order to counteract the degradation of the fibroin are the following:—low temperature and a substantial diminution of the content of the solution in basic compounds, i. e. ammonia and/or copper hydroxide.

Investigations have shown that solutions which have been prepared at a low temperature, for example 0 to —15° C., have a viscosity which is substantially higher than that of a solution prepared at ordinary temperature.

It has furthermore been found that the lower the content of the solution in ammonia, the less is the diminution in the viscosity of the solution during standing. Quite remarkable results may be obtained by combining these features, that is to say, the use of a low temperature and of a solution containing a relatively low proportion of ammonia.

The ammonia content of the solution may be reduced in various ways. For example, there may be used from the start in the preparation of the solution only a small proportion of ammonia; it has been ascertained that even when the molecular ratio of $NH_3:Cu$ is less than 4:1 the quantity of copper which must be used scarcely exceeds that which is necessary when the proportion of $NH_3:Cu$ is greater.

Of especial importance is the observation that after making the solution of fibroin, ammonia, which has a degrading action on the fibroin molecule, may be removed to a great extent without causing coagulation of the fibroin complex. For example, the procedure may consist in removing ammonia from the solution by suction or by passing through the solution a current of an inert gas. Other investigations have shown that by means of suitable liquids the fibroin complex may be precipitated from its solutions in ammoniacal copper hydroxide, and may thereupon be redissolved in water; this procedure likewise results in the removal of the deleterious ammonia.

As a compound suited for precipitating the fibroin-copper compound we may either use organic liquids miscible with water, such as methanol, ethanol, acetone and so on or salt solutions prepared, for instance, from ammonium sulfate, sodium sulfate, or sodium chloride.

Furthermore, it is of an essential value to reduce the content in copper hydroxide in the solvent in order to avoid degradation of the fibroin. When using copper hydroxide not more than 30 parts by weight of copper in form of the hydroxide are necessary to dissolve 100 parts by weight of degummed, air-dried fibroin. For an exhaustive use of the copper compound employed care is to be taken that the copper is not partly present in form of a basic salt or carbonate or otherwise bound by an acid. For dissolving the fibroin only copper hydroxide is to be taken into consideration while any copper bound in form of a salt is without value. By avoiding an excess of copper hydroxide not bound by the fibroin, the further advantage is gained that a solution of fibroin thus prepared may be filtered without difficulties through a cellulosic filter mass, such as wadding without effecting a swelling of this filter mass, as would be the case if the solvent contains an excess of copper hydroxide. When employing copper salts in the preparation of the solvent, such an amount of a caustic alkali is to be added as is necessary to convert the whole quantity of copper into its hydroxide. An excess of alkali, however, must be avoided. As alkalies caustic soda, caustic potash, calcium or barium hydroxide may be used. If in the double decomposition of copper salt and alkali there are formed salts which separate from the solution by crystallization, these latter are preferably removed by filtration though they do not hinder dissolution of the fibroin.

The fibroin used in accordance with the invention may consist of silk or waste silk which may or may not have been degummed.

The following examples illustrate the invention, the parts being by weight:—

*Example 1.*—A freshly prepared paste of copper hydroxide containing one part of copper, is dissolved in 29 parts of a solution of ammonia of 10 per cent strength and the solution is cooled to about —5° C. 3 parts of degummed natural silk are then introduced, the whole is filtered whilst well stirring and further cooling, and the filtered solution is maintained at a temperature of —5° C. until it is spun.

*Example 2.*—1410 parts of a paste of copper hydroxide containing 330 parts of copper, are kneaded for about 2½ hours at —2° C. together with 1000 parts of degummed waste silk (corresponding with 930 parts of dry substance) and 981 parts of a solution of ammonia of 22 per cent strength. 2360 parts of water are then added slowly whilst continuously stirring and cooling. The solution is then filtered and may immediately be spun.

*Example 3.*—A freshly prepared paste of copper hydroxide free of anions prepared in the known manner and containing 0.81 parts of Cu is dissolved in 29 parts of a solution of ammonia of 10 per cent strength. After cooling the solution below zero, 3 parts of degummed silk are introduced while thoroughly stirring and cooling. After stirring for ½ to 1 hour, a viscous solution free of fibers is obtained which may be further worked up and spun.

*Example 4.*—To 3.2 parts of finely powdered crystallized copper sulfate are added 28 parts of a solution of ammonia of 10 per cent strength and the whole is well stirred; thereupon there are added whilst stirring 1.05 parts of NaOH in the form of a solution of 33 per cent strength. The whole is cooled to —15° C. and filtered in order to remove sodium sulfate which has crystallized. 3 parts of degummed "frison" are then added and brought into solution by thoroughly stirring, whilst further cooling to maintain the temperature at —15° C. After the fibroin has completely dissolved there is passed through the solution a current of nitrogen introduced through finely perforated nozzles or the like whilst gradually heating the solution to 15–20° C.; the content of ammonia may thus be reduced to 2 per cent in an hour, or below 2 per cent if the passage of the nitrogen be continued for a longer period. The solution is thereupon filtered and after deaeration is led to the spinning machine.

*Example 5.*—To 3.2 parts of finely powdered crystallized copper sulfate are added 28 parts of a solution of ammonia of 10 per cent strength and the whole is well stirred; thereupon there are added whilst stirring 1.05 parts of NaOH in the form of a solution of 33 per cent strength. The whole is cooled to —15° C. and filtered in order to remove sodium sulfate which has crystallized. 3 parts of degummed "frison" are then added and brought into solution by thoroughly stirring, whilst further cooling to maintain the temperature at —15° C. After the fibroin has dissolved, the solution is mixed with 2–3 times its volume of acetone, whereby the fibroin is at once precipitated in the form of a tough black violet mass which can be drawn into threads. After pouring away the supernatant liquid, the mass is thoroughly kneaded with acetone and the liquid is poured off. The paste so obtained is then dissolved in the proportion of water required for producing the desired concentration of fibroin and the solution is filtered.

*Example 6.*—173 kg. of a Cu(OH)$_2$ paste containing 45 kg. of copper are mixed with 165 l. of ammonia of 22% strength (containing 36.3 kg. of NH$_3$). In this mixture 150 kg. of air-dried fibroin are introduced in about 60 minutes, the solvent being cooled to about —3 to —4° C. In order to diminish the viscosity of the mixture and to enhance the solubility of the silk, 150 l of H$_2$O are slowly added while introducing the last 75 kg. of silk. Then the mixture is stirred for further 1–1½ hours in order to completely dissolve the fibroin while diluting the mixture slowly by addition of 350 liters of water. The solution is further cooled to about —2° C. After filtration it contains 4.87% of Cu, 3.75% of NH$_3$ and 14.5% of fibroin. Then it is filled into a closed vessel provided with a stirrer or into a rotating drum provided with a water jacket and treated for 1 to 1½ hours under a vacuum of 12–15 mm. mercury. During this treatment the temperature in the water jacket may slowly fall from 34° C. to 24° C., the solution, however, shall not become warmer than 25° C. If the solution contains less than 2 mols of NH$_3$ per 1 mol Cu, it is filtered again and kept at a temperature of —2° to —1° C. before being spun. It contains only 1.86% of NH$_3$.

It is obvious that our invention is not limited to the foregoing examples or to the specific details given therein. Thus we may use when preparing the copper hydroxide-ammonia solvent a copper salt other than the sulfate or prepare the solvent by action of ammonia on metallic copper in the presence of air, care being taken, however, that the excess of ammonia in the solvent is not too high, since it is according to our invention removed from the fibroin solution to a great extent.

What we claim is:—

1. In the manufacture of a solution of fibroin in copper ammonia solutions the step which comprises keeping the temperature during the dissolving process below 0° C.

2. In the manufacture of a solution of fibroin in copper ammonia solutions the step which comprises keeping the temperature during the dissolving process at about —10 to —15° C.

3. In the manufacture of a solution of fibroin in copper ammonia solutions the step which comprises keeping the temperature during the dissolving process and during storing below 0° C.

4. In the manufacture of a solution of fibroin in copper ammonia solutions the step which comprises keeping the temperature during the dissolving process and during storing at about —10 to —15° C.

5. In the manufacture of a solution of fibroin in copper ammonia solutions the steps which comprise keeping the temperature during the dissolving process below 0° C. and standardizing the molecular ratio of NH$_3$:Cu to at most 4 gram-molecules of ammonia per 1 gram-molecule of Cu.

6. In the manufacture of a solution of fibroin in copper ammonia solutions the steps which comprise keeping the temperature during the dissolving process below 0° C. and standardizing the molecular ratio of NH$_3$:Cu to less than 4 gram-molecules of ammonia per 1 gram-molecule of Cu.

7. In the manufacture of a solution of fibroin in copper ammonia solutions the steps which comprise keeping the temperature during the dissolving process below 0° C. and standardiziing the molecular ratio of NH$_3$:Cu to less than 2 gram-molecules of ammonia per 1 gram-molecule of Cu.

8. In the manufacture of a solution of fibroin in copper ammonia solutions the steps which comprise keeping the temperature during the dissolving process below 0° C. and precipitating the copper-ammonia-fibroin compound by addition of a water-soluble organic liquid, separating the viscous mass formed and dissolving it again in water.

9. In the manufacture of a solution of fibroin in copper ammonia solutions the steps which comprise keeping the temperature during the dissolving process below 0° C. and reducing in the copper-ammonia-fibroin solution the content of ammonia by evaporation while warming the solution for a short time to a temperature of at most 25° C.

10. In the manufacture of a solution of fibroin in copper ammonia solutions the steps which comprise preparing a copper ammonia solution free of anions, keeping the temperature during the dissolving process below 0° C. and reducing the content of ammonia in the fibroin solution by evaporation.

11. In the manufacture of a solution of fibroin in copper ammonia solutions the steps which comprise preparing a copper-ammonia solution containing 45 parts by weight of copper in form of $Cu(OH)_2$ and 36.3 parts by weight of ammonia, cooling the solvent to about $-3$ to $-4°$ C. and dissolving in the mixture 150 parts of fibroin, filtering the solution, warming it to at most 25° C. while subjecting it to the action of a vacuum and cooling it again below 0° C.

12. A cooper-ammonia-fibroin solution containing per 1 mol Cu less than 2 mols of $NH_3$.

KARL BÖRNER.
ERNST ROSSNER.
HERBERT MAHN.
WILHELM IRION.